Feb. 21, 1967 C. M. MONROE 3,305,777
TRANSISTORIZED PHASE COMPARATOR WHEREIN ALL
THE TRANSISTORS OPERATE IN CLASS A
Filed Dec. 24, 1964 2 Sheets-Sheet 1

INVENTOR
CHARLIE M. MONROE
BY Hurvitz & Rose
ATTORNEYS

INVENTOR
CHARLIE M. MONROE

BY Hurvitz & Rose

ATTORNEYS

United States Patent Office 3,305,777

Patented Feb. 21, 1967

3,305,777

TRANSISTORIZED PHASE COMPARATOR WHEREIN ALL THE TRANSISTORS OPERATE IN CLASS A

Charlie M. Monroe, Huntsville, Ala., assignor to Melpar, Inc., Falls Church, Va., a corporation of Delaware Filed Dec. 24, 1964, Ser. No. 421,036
7 Claims. (Cl. 324—89)

The present invention relates generally to phase detectors and more particularly to a phase detector wherein the impedances and collector currents of a pair of complementary transistors are driven synchronously in opposite directions by a pair of signals having like frequencies.

The most generally utilized prior art phase detectors employ a relatively expensive single or double balanced transformer for coupling the signals to be phase compared to a diode network. The transformer usually causes mismatch between the source and the phase detector, thereby introducing wave distortion that negates, to a certain extent, the phase comparison information in the signal derived. Transformers also inherently have uneven frequency response, containing peaks due to distributed parameter resonances, that often preclude their use in wide band detectors. Of course, transformers are looked on with disfavor when designing microminiature and thin film circuits because of their bulk and weight.

Another disadvantage of the typical prior art detectors resides in their failure to follow amplitude variations through complete cycles of the sources compared. Because diodes are inherently very non-linear devices, possessing low amplitude dead bands, considerable non-linearities are introduced into the signals being compared. These non-linearities often prevent a true phase comparison between the signals at other than peak amplitude levels.

The output impedances of prior art phase detectors have generally been high, often mismatched with the load driven by the detector. In phase locked loops, where phase detectors are extensively used, the mismatch must be overcome with insertion of considerable D.C. amplification than can cause loop instability.

The present invention overcomes these disadvantages by employing a pair of class A operated complementary transistors having their emitter-collector paths series connected. The transistor impedances are synchronously varied in equal and opposite directions by a first source while their emitter-collector currents are varied in equal and opposite directions in respose to variations of the second source. The net current through the series-connected emitter-collector paths of the complementary transistors is monitored or sensed to provide a direct current indicative of the phase difference between the two sources. The transistors, effectively consitiuting a low impedance current source, are capable of driving a phase locked loop without significant D.C. amplification.

Coupling to the complementary transistors can be direct or capacitive, without the need for transformers. The impedance modulating signal is applied in parallel to the bases of the complementary transistors while the emitters of these transistors are driven out of phase by the complementary outputs of a transistor phase splitter responsive to the other input. Since transformer coupling is not needed, the disadvantages of these components, as discussed supra, do not reside with the circuit of the present invention.

Another advantage of the present circuit is that true multiplication, substantially without non-linearities, of the two signals applied to each transistor is attained, as a result of class A operation. In consequence, only like frequency or harmonic components of the two signals applied to each transistor affect the combined D.C. collector currents of the transistors. Also, multiplication over the entire period of both inputs applied to each transistor is attained, a feature that enables more accurate phase information to be derived than by comparing peak amplitude occurrence times. Virtually all non-linearities differing from true multiplication are cancelled by detection of the net flow of the complementary transistor collector currents. Cancellation occurs because the non-linearities usually occur simultaneously in equal and opposite directions in the matched, complementary transistors.

It is, accordingly, an object of the present invention to provide a new and improved phase detector.

Another object of the invention is to provide a new and improved phase detector having only D.C. or capacitive coupling so that the mismatch, bandwidth, monetary and miniaturization problems attendant with transformers are obviated.

A further object of the invention is to provide a new and improved phase detector having an output that is a low impedance current source.

An additional object of the invention is to provide a new and improved phase detector wherein common frequency components of the two input signals are phase compared over complete cycles of their amplitude variations as a result of true signal multiplication.

Still another object of the invention is to provide a new and improved phase comparator wherein the two signals to be compared are twice multiplied, in two separate circuits with opposite phase, and the multiplied signals are linearly combined so that deviations from true multiplication are cancelled.

Yet an additional object of the invention is to provide a phase detector employing a pair of class A operated complementary transistors having collector currents proportional to the product of the two detector inputs, the net magnitude and direction of the currents providing a phase indicating signal.

The above and still further objects, features and advantages of the present invention will become apparent upon consideration of the following detailed description of one specific embodiment thereof, especially when taken in conjunction with the accompanying drawings, wherein.

Figure 1:
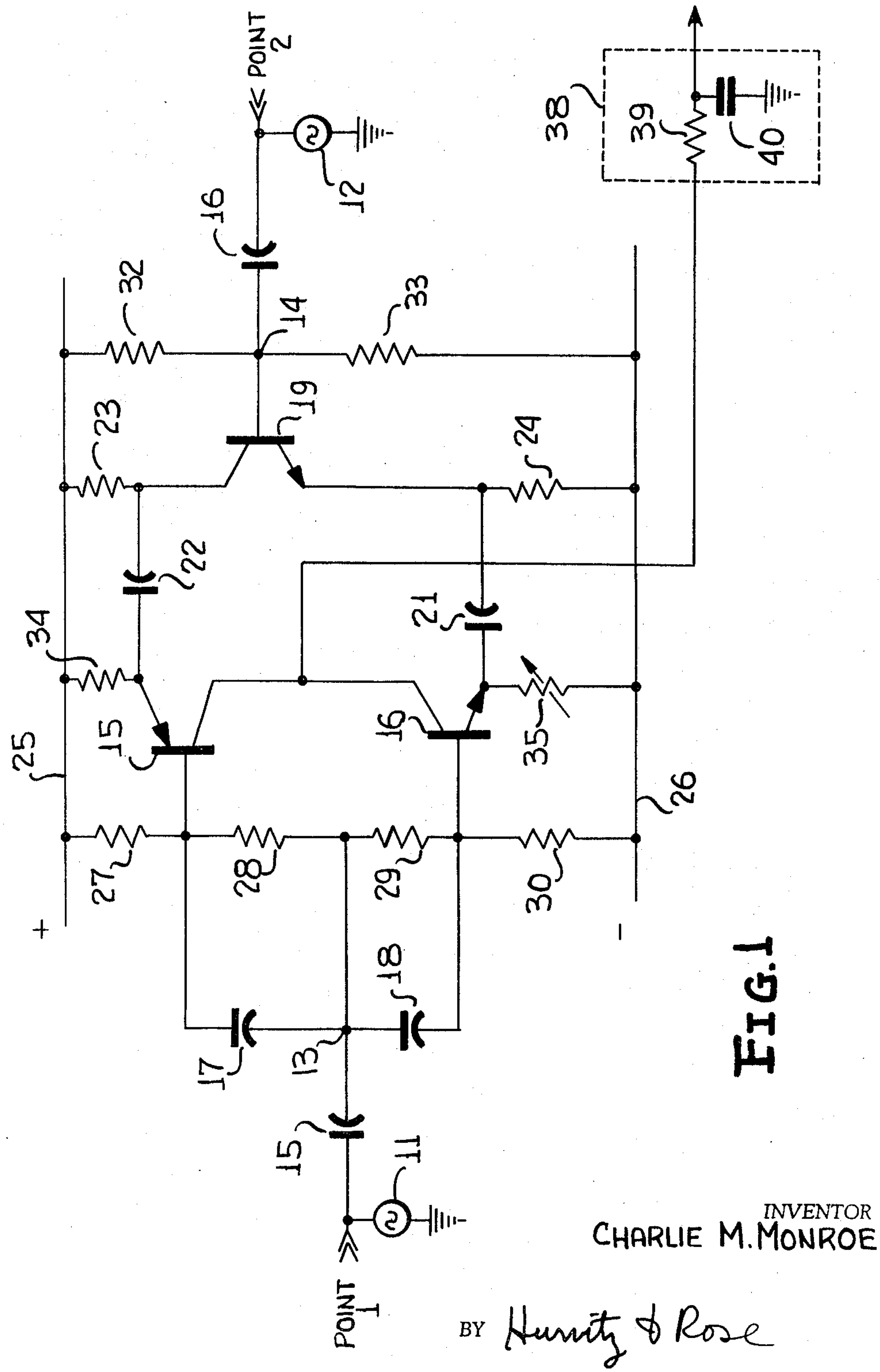
FIGURE 1 is a circuit diagram of one preferred embodiment of the invention.

Reference is now made to FIGURE 1 wherein A.C. signal sources 11 and 12, of substantially constant amplitude, but of variable frequency and phase, are applied to input terminals 13 and 14 via coupling capacitors 15 and 16, respectively. The signal at terminal 13 is coupled in parallel to the bases of complementary, matched transistors 15 and 16 by way of coupling capacitors 17 and 18, respectively. Signal at terminal 14 is fed to the emitters of transistors 15 and 16 through phase splitting NPN transistor 19 so that the phase splitter emitter is coupled through capacitor 21 to the emitter of NPN transistor 16 and its collector feeds the emitter of PNP transistor 15 via capacitor 22. The opposite polarity emitter and collector voltages deriving from transistor 19 are of substantially the same amplitude by selecting load resistors 23 and 24 to be of identical values.

The circuit of the present invention operates in class A, i.e. each of transistors 15, 16 and 19 is always functioning in the linear portion of its characteristic curve and is never driven to cut-off. To maintain transistors 15 and 16 in this operating mode, their bases are connected to the positive and negative D.C. operating potentials on lines 25 and 26 via taps on the voltage divider comprising resistors 27, 28, 29 and 30. The voltage divider midpoint, between resistors 28 and 29, is connected to terminal 13 so source 11 can be inserted via a single point to the bases of transistors 15 and 16. Class A operation for transistor 19 is established by the voltage divider comprising resistors 32 and 33, the tap of which is connected to the phase splitter base electrode.

To establish the operating point of transistors 15 and 16 so that they have substantially the same quiescent impedance, resistors 34 and 35 are respectively connected between the transistor emitters and lines 25 and 26. Quiescent impedance balancing is established by adjusting variable resistor 35.

The phase indicating signal is derived from the net current flowing through the series-connected emitter-collector paths of transistors 15 and 16. The collectors of transistors 15 and 16 are connected to integrator 38 comprising resistor 39 and shunt capacitor 40. The time constant of integrator 38 is selected to be in excess of the period of the lowest frequency of sources 11 and 12 so that true averaging of sinusoidal waves occurs, i.e. the integrator output is zero for sinusoidal inputs. The integrator time constant must, however, be less than phase and frequency variations between sources 11 and 12 so that the network responds quickly to such changes to the inputs. If the circuit is utilized to drive a meter, or other low impedance load, the integrator output is connected to the input of an emitter follower, the output of which is connected to the low impedance load. High impedance loads, e.g., voltage responsive variable capacitors, can be driven directly from the integrator output. In both instances, the D.C. level of the driven device must be arranged to offset the quiescent current at the common terminals of transistors 15 and 16.

In operation, the signal at terminal 13 drives the impedances of transistors 15 and 16 in opposite directions at any instant because the transistors are of complementary types. The signal at terminal 14 drives current into the emitters of transistors 15 and 16 in opposite directions at any instant as a result of the relative phase inversion between the signals at the emitter and collector of transistor 19. The complementary currents flowing into the emitters of transistors 15 and 16 are modulated by the complementary impedance variations of these transistors. The resulting net current flowing through the emitter-collector paths of the complementary transistors is integrated to provide a D.C. signal at the output of integrator 38 indicative of the phase difference, $\phi$, between signal sources 11 and 12.

Mathematically, it can be shown that the output of integrator 38 is directly proportional to cos $\phi$, assuming sinusoidal inputs. In this consideration;

$i_{Q1}$=collector output current of transistor 15;
$i_{Q2}$=collector output current of transistor 16;
$i_0=i_{Q1}+i_{Q2}$;
$G_0$=quiescent conductance of each of transistors 15 and 16;
$G_1$=maximum conductance variation of each of transistors 15 and 16 in response to signal source 11;
$W_1$=angular frequency of sources 11 and 12;
$t$=time;
$\phi$=relative phase difference between sources 11 and 12;
$E_0$=quiescent collector-emitter voltage of each of transistors 15 and 16; and
$E_2$=the maximum voltage variation of source 12.

From these definitions, $$i_{Q1}=[G_0+G_1 \sin (W_1t+\phi)][E_0-E_2 \sin W_1t]$$
$$=E_0G_0-E_2G_0 \sin W_1t+E_0G_1 \sin (W_1t+\phi) -E_2G_1 \sin (W_1t+\phi) \sin W_1t$$
$$i_{Q2}=[G_0+G_1 \sin (W_1t+\phi)][E_0-E_2 \sin W_1t]$$
$$=E_0G_0+G_0E_2 \sin W_1t-E_0G_1 \sin (W_1t+\phi) -E_2G_1 \sin (W_1t+\phi) \sin W_1t$$

Since $i_{01}=i_{Q1}+_{Q2}$, $$i_0=2E_0G_0-2E_2G_1 \sin (W_1+\phi) \sin W_1t$$

Multiplying and expanding, $$i_0=2E_0G_0-2E_2G_1[\tfrac{1}{2} \cos \phi-\tfrac{1}{2} \cos (2W_1t+\phi)]$$

Figure 2:
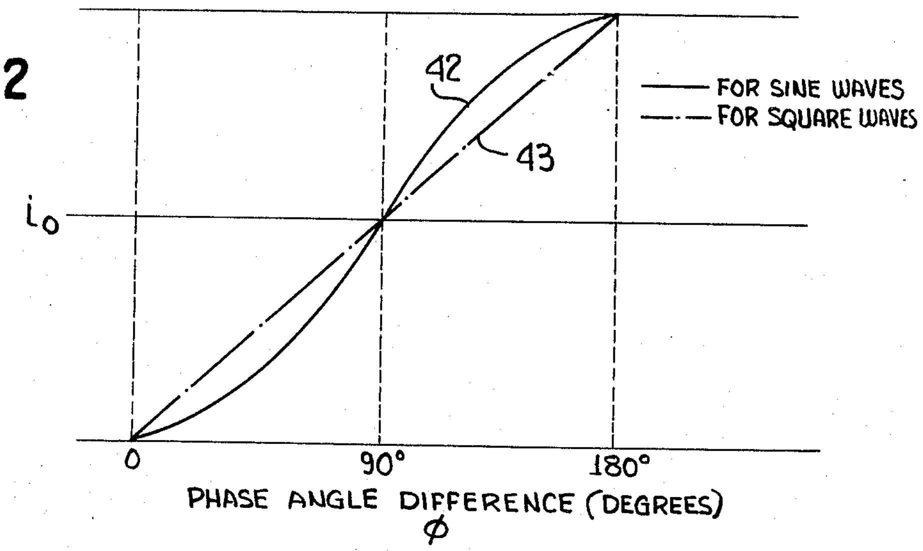
FIGURE 2 shows responses of the FIGURE 1 circuit for sinusoidal and square wave inputs.

The $2E_0G_0$ term is eliminated by proper selection of source 37 while the $E_2G_1 \cos (2W_1t+\phi)$ term is averaged to zero by integrator 38 so that the integrator output voltage is proportional to $-E_2G_1 \cos \phi$. Since variations of $\phi$ are much slower than frequency $W_1$, the integrator output quickly changes in response to increments of $\phi$. This sinusoidal relationship between phase angle and output current is verified by solid line 42 of FIGURE 2.

It is to be understood that phase comparison according to the present invention is not limited to sinusoidal waves. In fact, all waves having the same frequency and general waveshape can be applied to the phase detector of the present invention, as straight line curve 43, FIGURE 2, indicates for the highly harmonic square wave situation. Also, it is possible to detect the phase relationship between common frequency components of waves having different fundamental and harmonic content. Thus, if source 11 has frequency components $W_3$, $W_5$, $W_7$ and $W_9$ while source 12 has frequency components $W_7$, $W_{14}$, $W_{21}$, the detector of FIGURE 1 derives an output proportional only to the phase difference between the $W_7$ components in sources 11 and 12. The remaining signals have no affect on the output of integrator 38 because they produce A.C. sum and difference frequencies that are of zero average value.

Figure 3:
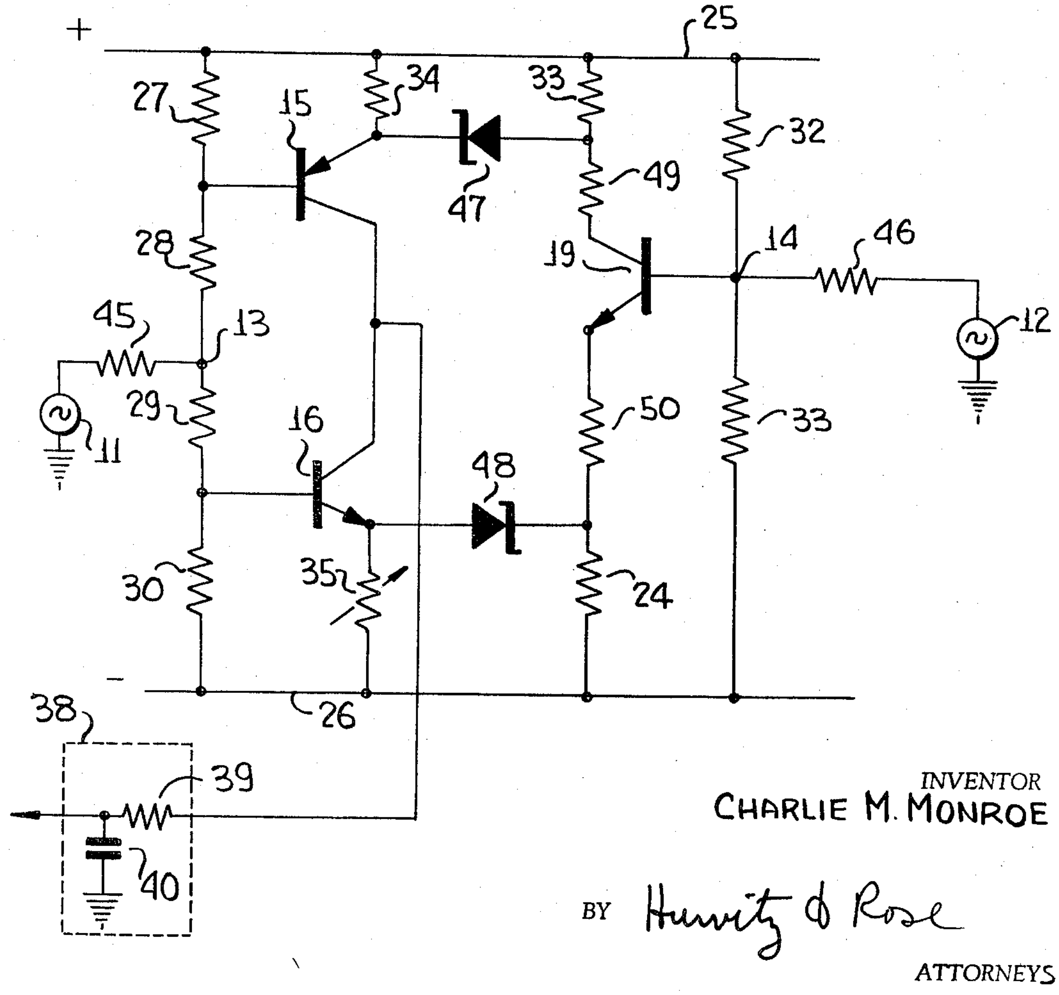
FIGURE 3 is a modfication of FIGURE 1 employing D.C. coupling.

For very low frequency applications, down to D.C., the circuit of FIGURE 1 is modified as indicated in FIGURE 3 wherein sources 11 and 12 are D.C. coupled to terminals 13 and 14 via resistors 45 and 46, respectively. The circuit comprising complementary transistors 15 and 16 is exactly as the FIGURE 1 circuit except that the need for capacitors 17 and 18 is obviated.

The coupling circuit from the emitter and collector of transistor 19 to the emitters of transistors 15 and 16 is established by the D.C. path comprising Zener diodes 47 and 48, respectively. Proper bias levels for diodes 47 and 48 is established by respectively connecting dropping resistors 49 and 50 in series between the collector and emitter electrodes of transistor 19 and resistors 23 and 24. Diodes 47 and 48 are connected so that they are forward biased, whereby the anode of the former is connected to the junction between resistors 23 and 49 while the cathode of the latter is connected to the tap between resistors 24 and 50.

While transistors 15, 16 and 19 are shown as being of the conventional silicon or germanium type, it is also understood that field effect transistors can be employed. Field effect transistors, in addition to offering very high input impedances, are easily fabricated with thin film techniques that enable the entire device to be fabricated as a micro-circuit.

While I have described and illustrated one specific embodiment of my invention, it will be clear that variations of the details of construction which are specifically illustrated and described may be resorted to without departing from the true spirit and scope of the invention as defined in the appended claims.

I claim:

1. Means for detecting the phase difference between like frequency components of a pair of input signals, said means including a pair of matched complementary type transistors, the emitter-collector paths of said transistors being series connected, a pair of power supply terminals for said transistors, means connecting said series-connected emitter-collector paths across said power supply terminals, means biasing said transistors for class A operation over the entire range of anticipated levels of signal to be applied thereto, means for applying one of said input signals in parallel to the base electrodes of said transistors, a further transistor having its emitter-collector path connected across said power supply terminals, means respectively connecting the emitter and collector electrodes of said further transistor to the emitter electrodes of said complementary transistors, means biasing said further transistor for class A operation over the entire range of anticipated levels of signal to be applied thereto, means for applying the other of said input signals to the base electrode of said further transistor, and means connected to the junction between the emitter-collector path of said complementary transistors in said series connection for deriving from the net current flowing therethrough a signal indicative of the phase difference between said pair of input signals.

2. The invention according to claim 1 wherein said means for deriving comprises an integrator.

3. The invention according to claim 1 wherein both of said means for applying input signals consist of D.C. coupling components.

4. The invention according to claim 1 wherein both of said means for applying input signals comprise capacitive coupling components.

5. The invention according to claim 3 wherein said means respectively connecting the emitter and collector electrodes of said further transistor to the emitter electrodes of said complementary transistors comprise Zener diodes.

6. The invention according to claim 4 wherein said means respectively connecting the emitter and collector electrodes of said further transistor to the emitter electrodes of said complementary transistors comprise further capacitive coupling components.

7. A phase comparator for detecting the relative phase difference between a pair of signals, said comparator comprising a pair of transistors of opposite conductivity types having series-connected output circuits, means responsive to one of said pair of signals for parallel application of said one signal to the input circuits of both said transistors, means biasing said transistors for class A operation, an amplifier responsive to the other of said signals for developing therefrom a pair of oppositely phased signals of substantially the same amplitude, means biasing said amplifier for class A operation, means for respectively applying said oppositely phased signals to the output circuits of said pair of transistors, whereby application of the first-named pair of signals to said phase comparator produces a net current flow through said series-connected output circuits dependent upon the relative phase of like frequency components of said first-named pair of signals, and means for sensing said net current flow for detection of said relative phase difference.

References Cited by the Examiner

UNITED STATES PATENTS

| | | | |
|---|---|---|---|
| 2,901,612 | 8/1959 | Dwork et al. | |
| 2,924,757 | 2/1960 | Schaeve | 324—89 |
| 3,019,374 | 1/1962 | Ladd | 324—87 |
| 3,171,984 | 3/1965 | Eshelman et al. | 307—88.5 |
| 3,184,680 | 5/1965 | Bull | 324—87 X |
| 3,188,491 | 6/1965 | Bahn | 307—88.5 |
| 3,223,851 | 12/1965 | Kitchens et al. | 307—88.5 |

RUDOLPH V. ROLINEC, *Primary Examiner.*

P. F. WILLE, *Assistant Examiner.*